United States Patent
Klein et al.

(10) Patent No.: US 6,579,493 B1
(45) Date of Patent: Jun. 17, 2003

(54) PROCESS FOR REMOVAL OF BINDERS FROM PARTS PRODUCED BY POWDER INJECTION MOLDING

(75) Inventors: Aloisio Nelmo Klein, Florianopolis (BR); Joel Louiz R. Muzart, Florianopolis (BR); Antonio Rogerio Souza, Florianopolis (BR); Marcio Celso Fredel, Florianopolis (BR); Paulo Antonio Pereira Wendhausen, Florianopolis (BR); Maribondo do Nascimento Rubens, Florianopolis (BR)

(73) Assignee: LupaTech S.A., Caxias Do Sul (BR)

( * ) Notice: Subject to any disclaimer, the term of this patent is extended or adjusted under 35 U.S.C. 154(b) by 0 days.

(21) Appl. No.: 09/980,741

(22) PCT Filed: May 23, 2000

(86) PCT No.: PCT/BR00/00057
§ 371 (c)(1),
(2), (4) Date: Oct. 19, 2001

(87) PCT Pub. No.: WO00/73002
PCT Pub. Date: Dec. 7, 2000

(30) Foreign Application Priority Data

May 27, 1999 (BR) .......................... PI 9901512

(51) Int. Cl.$^7$ .................................................. B22F 1/00
(52) U.S. Cl. ........................ 419/36; 419/37; 264/669; 264/670
(58) Field of Search ................ 419/36, 37; 264/669, 264/670

(56) References Cited

U.S. PATENT DOCUMENTS

| | | | | |
|---|---|---|---|---|
| 4,619,836 A | * | 10/1986 | Prabhu et al. | 427/41 |
| 4,666,775 A | * | 5/1987 | Kim et al. | 428/398 |
| 6,093,761 A | * | 7/2000 | Schofalvi | 524/195 |

* cited by examiner

*Primary Examiner*—Daniel J. Jenkins
(74) *Attorney, Agent, or Firm*—Hedman & Costigan, P.C.

(57) ABSTRACT

A process for the removal of binder material from powder injected molded parts that employs a low pressure plasma reactor to generate reactive species which react with the binder material in the injected molded part is presented. The reactive species cause the binder material to break down into smaller molecules and thereby be removed from the injected molded part.

14 Claims, 1 Drawing Sheet

PROCESS FOR REMOVAL OF BINDERS FROM PARTS PRODUCED BY POWDER INJECTION MOLDING

Figure 1:
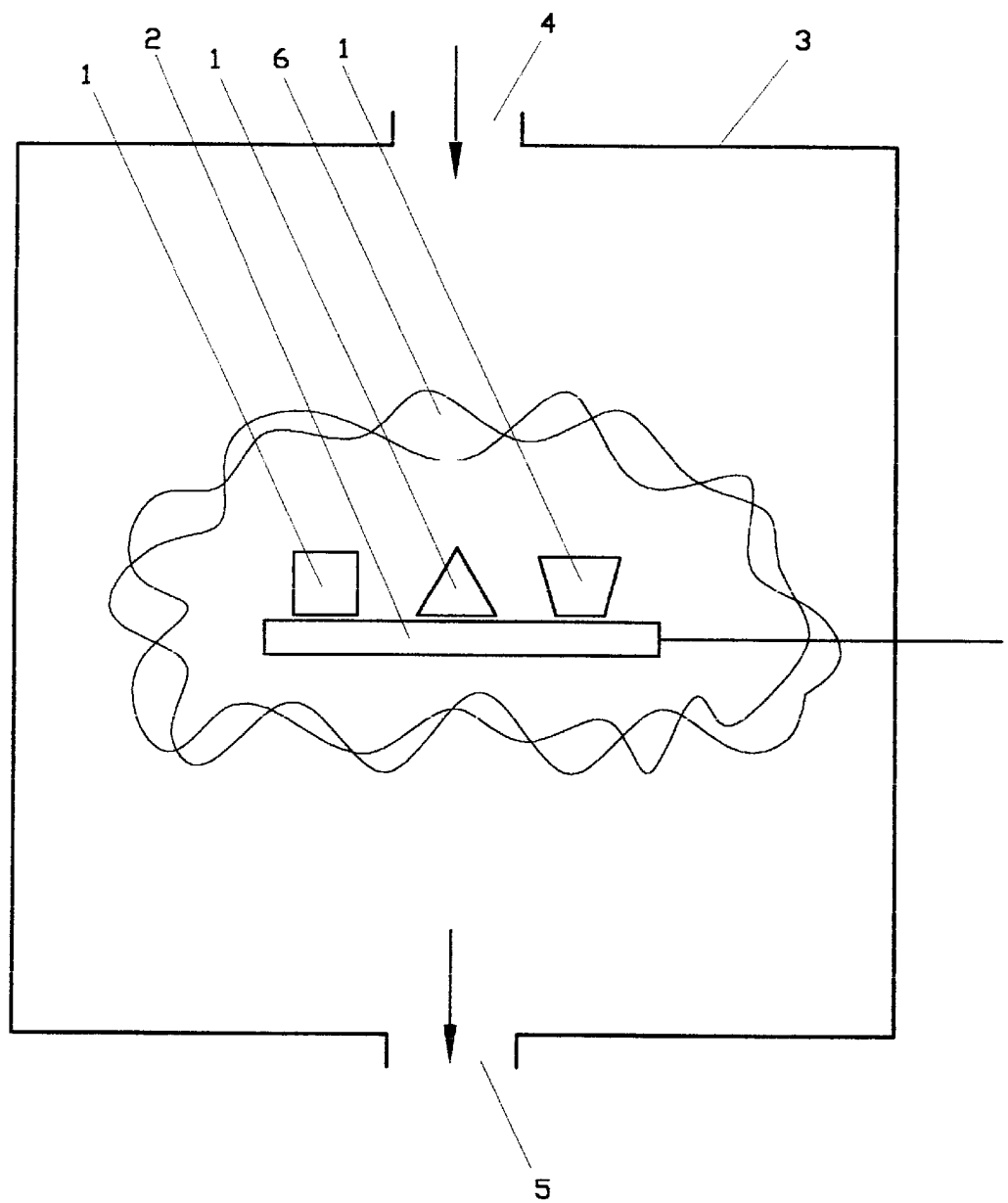

The present invention relates to a thermo chemical process for removing the binders from metallic and/or ceramic powder injection molded parts. The process uses electrical discharge in a low-pressure hydrogen or another molecular or atomic gas environment to produce reactive species that heat the parts in order to remove the existing binders from inside the parts in a period of time shorter than the one in conventional processes.

The powder metallurgic techniques are very efficient from a technological and economically competitive point of view in the serial manufacturing of parts with complex geometry from iron, steel or other metallic alloys. Within these techniques the injection of metallic and/or ceramic powders with organic binders in molds is one of the most promising. Even so, removing the organic binders after the injection molding and before conducting the final sintering process is a limiting factor. The existent extraction processes demand an excessively long processing time, coming close to dozens of hours thereby, reducing the productivity and raising the price of the product produced by injection molding of powders. Besides demanding an excessively long time, the current binder removal processes produce many pollutants, because they liberate long chain hydrocarbons or they involve burning, which produces residues such as carbon monoxide. The most commonly used binders are mixtures of wax and other polymers, such as, polyethylene, polypylene and polyacetate.

Processes where the plasma technology is used now include, nitrating, carbonitrating, cementation, oxidation and sintering among others.

The process of binder removal by plasma of the present patent application, results in a smaller quantity of gases being emitted. This quantity of gas is essentially short chain hydrocarbons gases, predominantly methane, and can be discharged without any burning with oxygen, thereby avoiding liberation of carbon monoxide.

In the present invention the injected molded part is heat by ions bombarding the cathode. The cathode acts as the injection molded part support. The injection molded part is bombarded together with the cathode and consequently the injection molded part becomes warm. The injection molded part heating happens because the electric discharge of the cathode is connected to the negative voltage of the power source; the ions are strongly accelerated in the cathode sheath electric field straight to the cathode and when hitting the cathode they heat it up. The sintering process by plasma is described for example in PI 9603488-2.

The removal of the binder by the plasma process, herein described, consists of using the plasma technology to produce, besides the heating of the injection molded part, reactive species. These reactive species are fundamental for the kinetics increase of qthe process and cause the removal of the binder to occur in an order of 10 times quicker than in traditional processes. The reactive species are obtained by the electrons of the high kinetic discharge colliding with molecules of hydrogen. The presence of these reactive species is a fundamental difference between the process of the present invention and the other processes of binder removal.

The process of binder removal by plasma uses electric discharge in an environment of low pressure, the plasma reactor, which contains a gaseous mixture containing $H_2$ as the main gas. Other atomic or molecular gases such as argon, oxygen, nitrogen or mixtures thereof in variable proportions also can be used to obtain the reactive species for the removal of the binder. The process is described in FIG. 1.

FIG. 1 exhibits a simplified outline of a plasma reactor environment, used for the binder removal, from injection molded parts. Shown in FIG. 1 is: the injection molded part (1) to be processed, the support for the injection molded part (2), the body of the oven (3), the entrance (4) of the gaseous mixtures, the vacuum system (5), and the plasma (6).

The injected molded parts (1) to be processed are placed on the support (2). The support (2) and injection molded parts (1) are surrounded by the plasma (6), and heated by the bombarding of the ions, atoms or fast molecules and by heat radiation from the cathode of the electric discharge circuit.

In the electric discharge, besides the ions and atoms or molecules with high kinetic energy that are used for the heating of the injected molded parts, there are also the electrons that have much higher kinetic energy than the ions. So, three important reactions take place to remove organic binder from the injection molded parts:

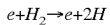

$$e + H_2 \rightarrow e + 2H$$

means, a high-speed electron collides with a $H_2$ molecule, producing the molecule dissociation with kinetic energy loss of the electron. The other verified reaction:

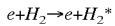

$$e + H_2 \rightarrow e + H_2^*$$

means, a high-speed electron collides with a $H_2$ molecule, producing the excitement of this molecule, with making the electron kinetic energy loss of the electron. Another observed reaction is:

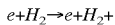

$$e + H_2 \rightarrow e + H_2^+$$

means, a high-speed electron collides with a $H_2$ molecule, producing a molecular ion of hydrogen kinetic energy loss of the electron.

As a result of these reactions, the gaseous environment of the oven (3) contains particles, such as atomic hydrogen or hydrogen molecules, in a high potential energy level, and also the molecular ion of hydrogen. The first two reactions presented above constitute the chemical part of the thermochemical process for removal of the binder while the third reaction is responsible for the thermal part of the process, that is, the part responsible heating the injection molded part. All those are high chemical reactivity particles. Thus, once in contact with the binder of the injection molded part (1) they produce an activated chemical reaction breaking the carbonic chain of the organic binder material in a much shorter time period than the conventional processes. As a result carbon and volatile hydrogen are withdrawn from the reactor environment (3) by the vacuum pump (5). It is important to point out that other atomic or molecular gases, such as the argon, oxygen, nitrogen or mixtures thereof in variable proportions can also be used to obtain the reactive species.

Besides having shorter periods of time for removal of the binder, a smaller energy consumption and smaller amount of pollutants another beneficial characteristic of the process herein described, is that the same plasma oven used for the binder removal may also be used for sintering the injected molded parts by plasma. This way, after finishing the binder removal by plasma, it is enough to adjust the oven to accomplish the plasma sintering which consists of changing the gases, temperature and internal oven pressure. As a consequence, one performs the removal of the binder and the sintering in the same equipment and in a same thermal cycle, with economy of energy, with smaller investment and in much less time.

The process herein described, compared to the existent processes, removes the binder in a period of time up to 10 time less. It is also a process that produces much less pollutants, because the residues are gaseous components of small carbonic chains and hydrogen. The process can be monitored and automated, since the removal of the binder can be controlled by mass spectrometry or optic spectrometry, defining the final point of the process accurately. It is possible to execute the removal of the binder and the plasma sintering in the same reactor (3), allowing the process to take place in the same thermal cycle.

What is claimed is:

1. A process for the removal of binder material from injection molded parts comprising:
   a. placing the injected molded part comprising a binder material into a plasma reactor;
   b. adding a gaseous blend to the plasma reactor;
   c. forming a plasma with reactive species in the reactor from the gaseous blend; and
   d. contacting the injected molded part with the reactive species to remove the binder material from the injected molded part.

2. The process defined in claim 1 wherein the gaseous blend comprises hydrogen, argon, oxygen, nitrogen and combinations of the foregoing.

3. The process defined in claim 1 wherein the gaseous blend comprises hydrogen.

4. The process defined in claim 1 wherein the reactive species are formed by electric discharge.

5. The process as defined in claim 1 wherein the binder material is an organic binder material.

6. The process as defined in claim 5 wherein the organic binder material is a wax or polymeric material.

7. The process as defined in claim 6 wherein the polymeric material is polyethylene, polypropylene or polyacetate.

8. The process as defined in claim 1 wherein the injected molded part is a metallic, ceramic or metallic and ceramic injected molded part.

9. A process for the removal of an organic binder material from an injection molded parts comprising:
   a. placing a metallic, ceramic or metallic and ceramic injected molded part comprising an organic binder material into a plasma reactor;
   b. adding a gaseous blend to the plasma reactor;
   c. forming a plasma with reactive species in the reactor from the gaseous blend; and
   d. contacting the injected molded part with the reactive species to remove the organic binder material from the injected molded part.

10. The process defined in claim 9 wherein the gaseous blend comprises hydrogen, argon, oxygen, nitrogen and combinations of the foregoing.

11. The process defined in claim 9 wherein the gaseous blend comprises hydrogen.

12. The process defined in claim 9 wherein the reactive species are formed by electric discharge.

13. The process as defined in claim 9 wherein the organic binder material is a wax or polymeric material.

14. The process as defined in claim 13 wherein the polymeric material is polyethylene, polypropylene or polyacetate.

* * * * *